Feb. 7, 1967   A. W. BARBER   3,303,415
BRIDGE CONTROLLED POWER SUPPLY
Filed March 9, 1964   4 Sheets-Sheet 1

INVENTOR.
Alfred W. Barber

Feb. 7, 1967   A. W. BARBER   3,303,415
BRIDGE CONTROLLED POWER SUPPLY
Filed March 9, 1964   4 Sheets-Sheet 2

INVENTOR.
Alfred W. Barber

INVENTOR.
Alfred W. Barber

# United States Patent Office 3,303,415
Patented Feb. 7, 1967

3,303,415
BRIDGE CONTROLLED POWER SUPPLY
Alfred W. Barber, Oakland Gardens, N.Y., assignor to Forbro Design Corp., New York, N.Y., a corporation of New York
Filed Mar. 9, 1964, Ser. No. 350,159
7 Claims. (Cl. 323—9)

The present invention concerns regulated power supplies and, in particular, regulated power supply circuits provided with versatile control capabilities.

Regulated power supplies which regulate voltage or current or both are widely used in electronics and associated fields. A circuit which has been found to be very useful in regulated power supplies includes a bridge-like circuit having four elements. These elements include a reference, a reference resistor, the load resistance and a variable voltage control resistor, all connected in a closed four point loop circuit. An error or control amplifier connected across a diagonal of the bridge feeds a signal responsive pass device in series with a source of unregulated voltage and the load resistance. This basic circuit is shown and described in detail in U.S. Patent No. 3,028,538 to which reference is made for details of the operation of the regulating circuit outlined above.

While regulated power supplies were originally developed and produced for the purpose of supplying constant voltage or current to a load in the presence of variations in supply voltage or load resistance, many other uses have appeared in the art. These uses involve modifying the regulating function of the power supply as, for example, to supply an electric light with current in such a manner as to regulate the light output of the lamp. Other uses include supplying very low values of regulated current to a load and many remote control circuits.

It has been found, in accordance with the present invention, that the modified operation of the bridge controlled power supply can be readily accomplished by adding one or more additional circuit branches to the bridge circuit. These additional branches, in general consist of a voltage source and a resistor. By making the resistor variable, the effective sensitivity of the system to the modifying control can be varied. The voltage source in some cases is a fixed voltage while in others it is a variable voltage as one which is generated in response to variations in the circuit being controlled.

The control or regulation of power by the bridge circuit is possible to provide regulated voltage or regulated current or a combination. Current regulation can be accomplished by placing a current sensing resistor in series with the load and including this resistor as one element of the control bridge. Both voltage and current regulation can be provided in the same power supply by using two control bridges, one for voltage and one for current together with a cross-over circuit.

Accordingly, one object of the present invention is to provide methods of and means for controlling voltage or current or both in a regulated power supply in accordance with a modifying circuit response.

Another object is to provide power supply regulation capable of controlling load current down to very low values.

Still another object is to provide simple and effective sensitivity control in a regulation modifying circuit.

A further object is to provide a regulated power supply with response modifying circuits which are useful in a wide range of applications.

A still further object is to provide response modifying circuits in a regulated power supply which are not critical and which are simple to apply.

These and other objects will be apparent from the detailed description of the invention given below in connection with the various figures of the drawing.

In the drawing:

FIGURE 2 is a simplified schematic of one form of the present invention while

FIGURE 5 is a simplified schematic of one form of the present invention in an electric lamp control circuit while

Figure 1:
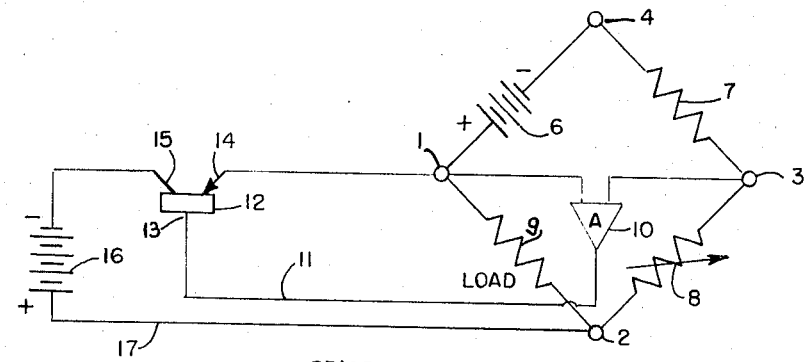
FIGURE 1 is a simplified schematic of the prior art regulating circuit.

FIG. 1 is a simplified schematic circuit diagram of the prior art circuit described in detail in the above referred to U.S. patent. The circuit includes a bridge-like circuit interconnecting terminals 1, 2, 3, and 4. A reference current is provided and is determined by the voltage of reference voltage 6 divided by the resistance of reference resistor 7. This current is to be matched by a current equal to the voltage between terminals 1 and 2 and across load resistance 9 divided by the resistance of variable resistor 8 connected between terminals 2 and 3. Error or control amplifier 10 is provided with its input terminals connected between reference terminal 1 and the junction between resistors 7 and 8 at terminnal 3 and its output connected over lead 11 to base 13, the signal control element of series pass transistor 12. The series pass transistor 12 is provided with collector 15 connected to the negative side of the source of voltage 16 to be regulated and with emitter 14 connected to common point 1. The positive side of source 16 is connected over lead 17 to terminal 2 which is also the positive voltage end of load 9. The action of amplifier 10 together witn pass transistor 12 is to regulate the voltage between terminals 1 and 2 until the voltage between terminals 1 and 3 is substantially zero. This condition will pertain when the voltage between terminals 1 and 4 divided by the resistance between terminals 4 and 3 is equal to the voltage between terminals 1 and 2 divided by the resistance between terminals 2 and 3.

Figure 2:
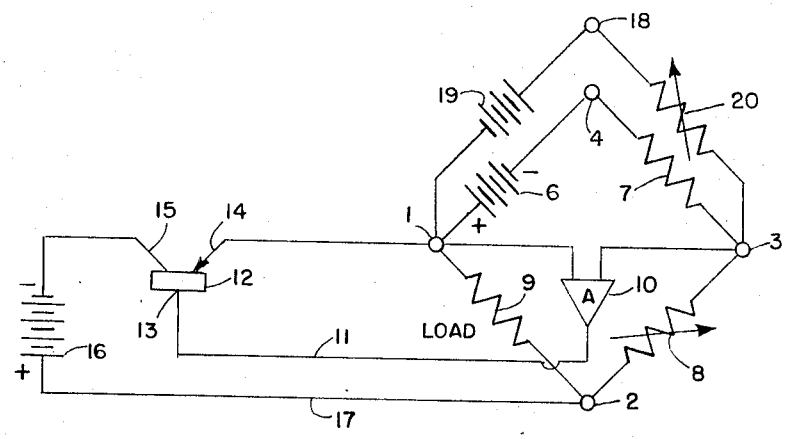

FIG. 2 is a circuit modification in which a third arm has been added to the bridge-like circuit connected between terminals 2 and 3. (The numbering of FIG. 1 has been utilized in the other figures of the drawing to indicate those parts corresponding to the parts of FIG. 1 and to more clearly distinguish the circuits added in accordance with the present invention.) In FIG. 2 the third arm which has been added consists of a voltage source 19 connected on one side to reference terminal 1 and on the other side to intermediate terminal 18 and one end of variable resistor 20 the other end of which is connected to bridge terminal 3. With this mode of connection the amplifier and pass transistor regulate to cause the current entering terminal 3 from resistor 8 to equal the sum of the currents leaving terminal 3 through resistors 7 and 20. The current leaving terminal 3 through resistor 20 may be either positive or negative but if negative it must be less than the positive current flowing into resistor 7. Thus, voltage 19 may be of either polarity or may be a differential voltage which varies on either side of zero.

Figure 3:
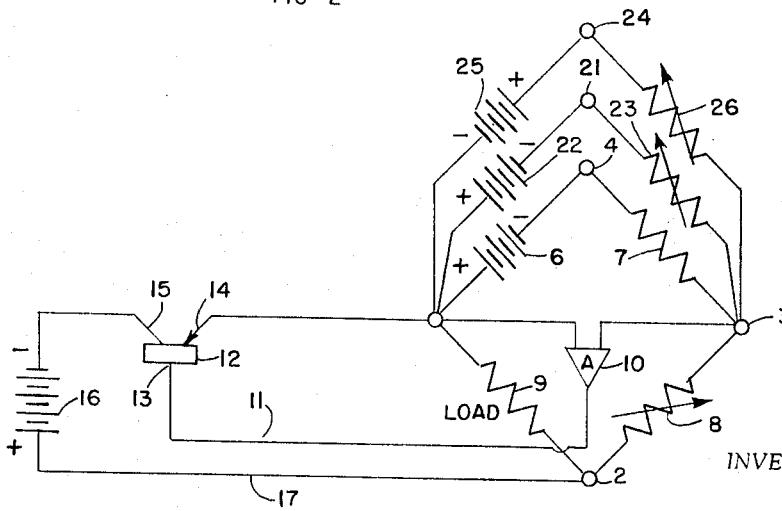
FIGURES 3 and 4 are modifications thereof.

FIG. 3 shows the addition of two arms or branches in parallel with the reference arm connected between bridge terminals 1 and 3. One of these arms includes voltage source 22 connected from reference terminal 1 and terminal 21 and variable resistor 23 connected from terminal 21 to bridge terminal 3. The second of these arms includes voltage source 25 connected from reference terminal 1 to terminal 24 and variable resistor 26 connected from terminal 24 to bridge terminal 3. As was described above in connection with FIG. 2 the amplifier and series pass transistor regulate to maintain the current flowing into terminal 3 equal to the current leaving terminal 3. The currents provided by the two added arms 22-21-23 and 25-24-26 may add to or subtract from the current provided by arm 6-4-7 as long as the net current is greater than zero and in the direction determined by arm 6-4-7. With the polarities as shown, although one or both may be reversed, arm 22-21-23 adds to the current determined by arm 6-4-7 and arm 25-24-26 subtracts from it. The added voltages 22 and 25 may be derived in many different ways. One or both may be derived as a function of the response of the load to the voltage applied to it. When so derived, additional regulating is provided. The relative effect of voltages 22 and 25 on the bridge regulation is a function of the values of resistors 23 and 26 respectively and these resistors may be used as sensitivity or gain controls. The circuit of FIG. 2 may be similarly employed.

Figure 4:
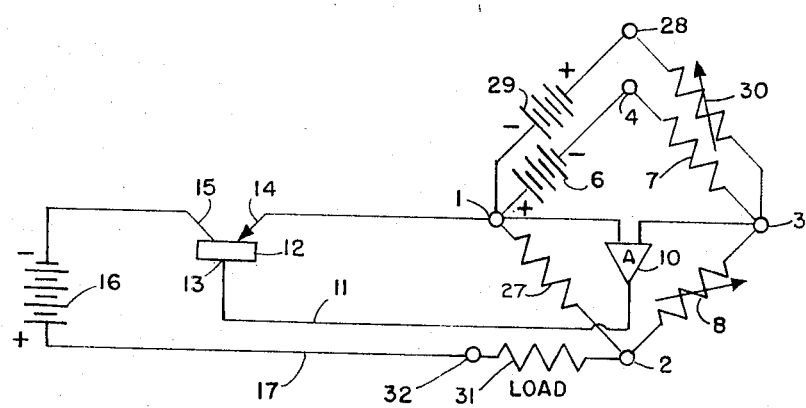

FIG. 4 shows a modification in which the basic form of FIG. 2 is modified for supplying regulated current to the load. The positive return lead 17 is removed from terminal 2 and the load 31 to be supplied with regulated current is connected from terminal 2 to the newly provided terminal 32. A current sensing resistor 27 is connected between terminals 1 and 2. The bridge balances, i.e., regulates as set forth above so that voltage divided by resistor 7 is equal to the voltage between terminals 1 and 2 (across current sensing resistor 27) divided by resistor 8. These ratios have the dimensions of current and may be referred to as the bridge current. The voltage drop in current sensing resistor 27 is equal to the sum of the bridge and load currents times its resistance. There is no particular problem when load currents are programmed which are large compared to the bridge current. The minimum current which the circuit will regulate is when resistor 8 is zero and the bridge current (voltage 6 divided by resistor 7) flows through the load 31. One way to reduce the bridge current and hence the minimum attainable load current is to increase the value of resistor 7. Since increasing resistor 7 also increases the impedance across the input to amplifier 10 and will lead ultimately to unstable operation, a preferable way to decrease the bridge current any given amount is to utilize a third bridge arm 29-28-30 providing a bucking bridge current. A voltage source 29 connected at one end to reference terminal 1 is connected in reversed polarity to reference voltage 6 to terminal 28 and through a variable control resistor 30 to terminal 3. The current flowing in arm 29-28-30 is in opposition to the normal bridge current and hence acts to reduce it. Suitable choices of voltage 29 and resistor 30 will permit reducing the bridge current and hence the programmable load current any desired amount down to a value approaching zero. It will be seen that when this is done the impedance across terminals 1 and 3 and hence the input to amplifier 10 is low and actually lower than it would have been at normal bridge current and without arm 29-28-30. Thus practically any reduction in programmed load current can be accomplished at reduced amplifier shunting impedance and hence with full system stability.

Figure 5:
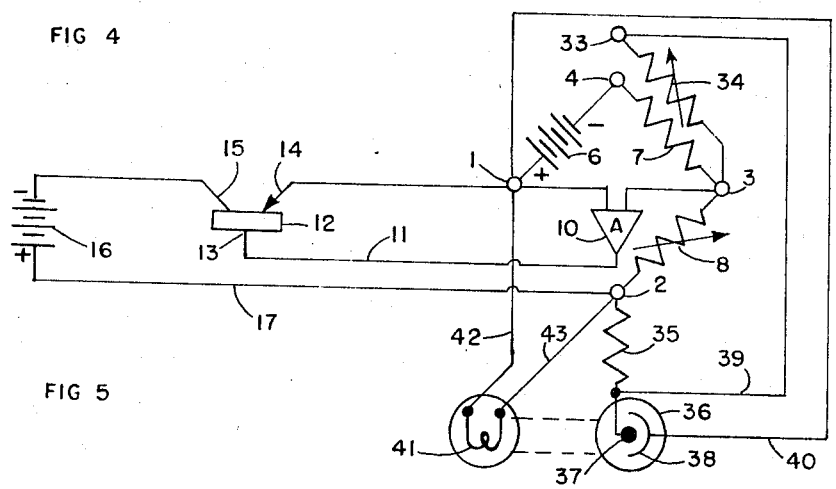

FIG. 5 illustrates a practical application and useful combination of the triple arm bridge in accordance with the present invention. In this application the voltage across an incandescent lamp is regulated by means of the triple arm bridge in accordance with the present invention. The lamp 41 to be regulated is connected as a load by means of leads 42 and 43 going to terminals 1 and 2 respectively. Photo-electric cell 36 is positioned to receive a predetermined amount of light from lamp 41 so that its response is in accordance with the intensity of illumination of lamp 41. A voltage drop is created across photo-electric cell 36 as a function of the lamp illumination and this voltage drop is utilized in the third bridge arm which includes terminal 33 and sensitivity control resistor 34. One simple manner for accomplishing the above is to return anode 37 of cell 36 through resistor 35 to the positive bridge voltage terminal 2 and to connect anode 37 over lead 39 to terminal 33 and cathode 38 over lead 40 to reference terminal 1. The voltage drop across the photo-electric cell is of opposite polarity to the reference voltage 6 and hence current in the third bridge arm will reduce the net bridge current and provide regulation in the proper phase to tend to stabilize the light output of lamp 41. The circuit is self-starting and stable. Disregarding the feed-back from the photo-electric cell for the moment, the initial and maximum voltage to appear across the lamp terminals can be set by adjustment of resistor 8. When the photo-electric cell regulation is added, it is in a direction to reduce the voltage across the lamp and, being degenerative, will tend to be stable. In case this regulation is lost for any reason, the lamp voltage can return only to its originally determined value, a considerable safety feature.

Figure 6:
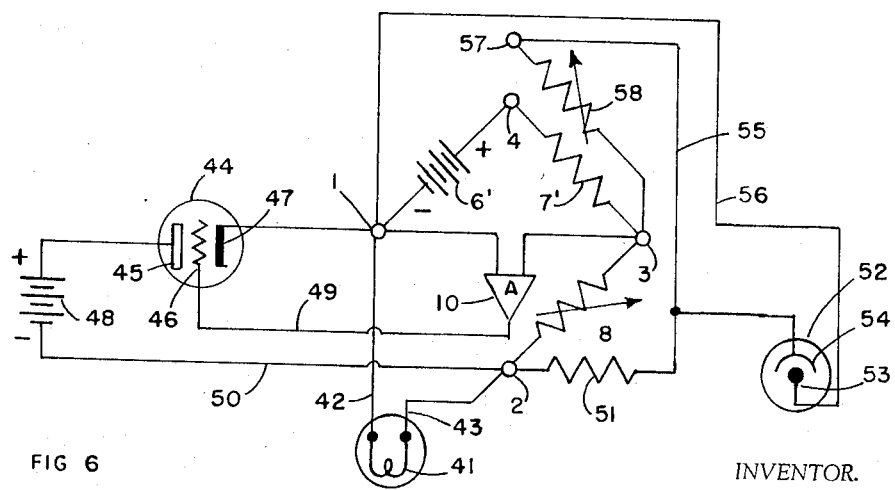
FIGURE 6 is a modification thereof.

FIG. 6 is a circuit which functions in a manner similar to that of FIG. 5 except that all polarities are reversed and a thermionic vacuum tube pass device is used. The pass tube 44 is provided with its cathode 47, heated by conventional means not shown, connected to reference terminal 1, plate 45 connected to the positive side of voltage source 48 and control grid 46 connected over lead 49 to the output of control amplifier 10. The negative side of voltage source 48 is connected to bridge terminal 2 over lead 50. The regulating function is provided by photo-electric cell 52 receiving light from lamp 41 to be regulated. Cathode 54 is returned to negative terminal 2 through load resistor 51. Cathode 54 is connected to terminal 57 over lead 55 and anode 53 is connected to reference terminal 1 over lead 56. The third bridge arm is completed by the variable sensitivity control resistor 58 connected from terminal 57 to terminal 3. The regulating action of this circuit is essentially the same as for FIG. 5 as described above. The vacuum tube circuit lends itself more particularly to high voltage lamps. While lamp 41 is shown as a filament type lamp, the system is applied to other types of lamps within the voltage and current capabilities of the power supply.

Figure 7:
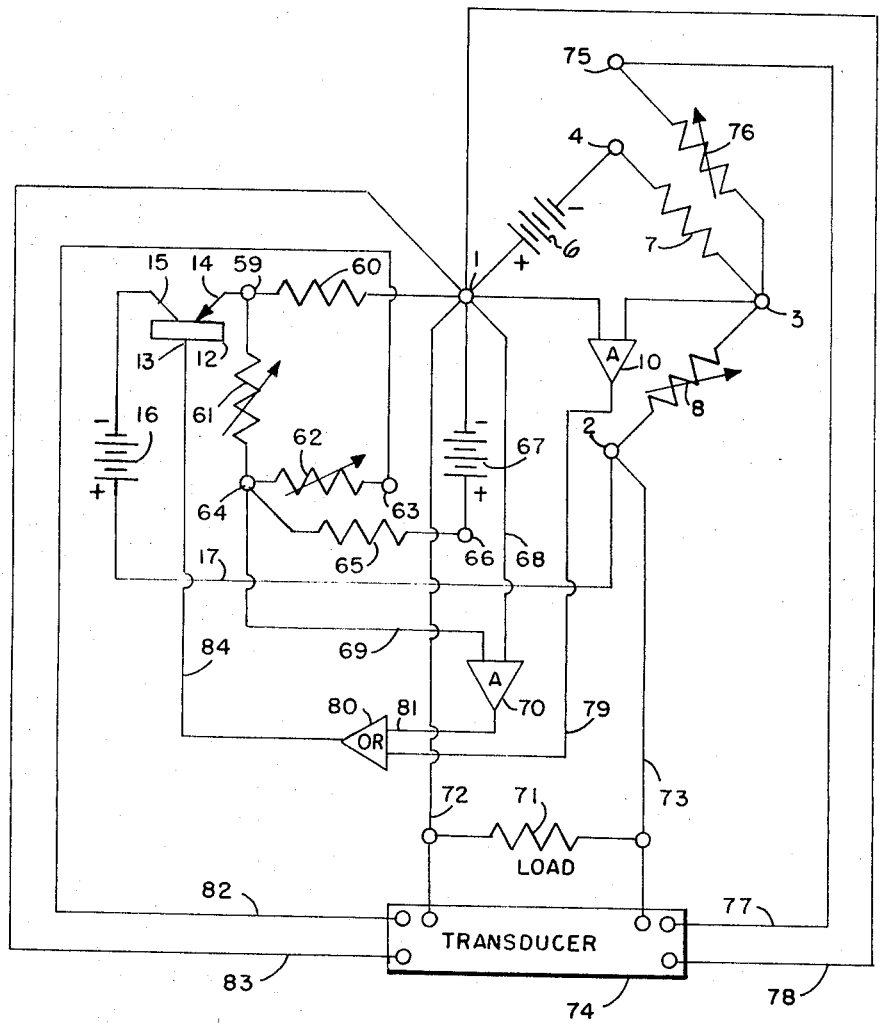
FIGURE 7 is a simplified schematic of a combination form of the present invention for modifying both voltage and current control.

FIG. 7 is a regulating circuit in which two bridge-like circuits are used, one for voltage regulation and the other for current regulation. A third feed-back arm has been added to each of these bridges in accordance with the present invention. The voltage bridge, control amplifier, pass transistor and voltage source employ components and function as set forth above and hence these components are numbered as are the corresponding components in the earlier figures. However, interposed between emitter 14 of the pass transistor 12 and the reference terminal 1 is a current control bridge including a current sensing resistor 60 and variable current control resistor 61 joined at 59 and forming a bridge arm between terminals 1 and 64. The current sensing resistor 60 is in series with the pass transistor and one of the output terminals and hence develops a voltage proportional to the load current. The reference arm of the current bridge includes a source of reference voltage 67 and a reference resistor 65 joined at 66 and forming the second arm of the current bridge between terminals 1 and 64. Regulation to cause this current bridge to balance is accomplished by means of control amplifier 70 bridged across terminals 1 and 64 by means of input leads 68 and 69, and being connected in signal controlling relationship with pass transistor base 13 over output lead 81, through OR circuit 80 and over lead 84. The current regulating function operates to satisfy the condition that the voltage across current sensing resistor 60 divided by the value of resistor 61 is equal to the voltage of reference 67 divided by the value of resistor 65. The voltage bridge amplifier 10 also is connected to OR circuit 80 over lead 79. The action of the OR circuit 80 determines at any given instant or condition whether the voltage bridge or the current bridge is in control or is regulating the system as will be explained more fully below.

A load 71 to be supplied with regulated voltage or regulated current is connected over leads 72 and 73 to load terminals 1 and 2. The OR circuit 80 may be a conventional OR circuit which selects the larger of the two input signals, i.e., the one from the voltage bridge control amplifier 10 or the one from the current bridge control amplifier 70 and passes the resulting control signal to control base 13 of the series pass transistor. Such a system is said to have an automatic crossover characteristic since it automatically switches from voltage to current control or vice versa depending on the voltage and current control settings and the value of the load resistor.

The third bridge arms in accordance with the present invention are applied to both the voltage and the current bridges. Transducer 74 is shown connected across load 71 and may be taken to represent means for deriving a voltage responsive function and a current responsive function with reference to the voltage across or the current through load 71. The voltage responsive function is conducted over leads 77 and 78 to be applied between reference terminal 1 and the terminal 75 forming a part of the third arm of the voltage control bridge. The sensitivity control variable resistor 76 connected between terminals 75 and 3 completes the third arm of the voltage bridge regulating circuit. The current responsive function is conducted over leads 82 and 83 to be applied between reference terminal 1 and the terminal 63 forming a part of the third arm of the current control bridge. The sensitivity control variable resistor 62 connected between terminals 63 and 64 completes the third arm of the current bridge regulating circuit. In this way a load may be powered from a voltage/current regulated power supply and feedback auxiliary regulating may be provided for both voltage and current regulators.

Figure 8:
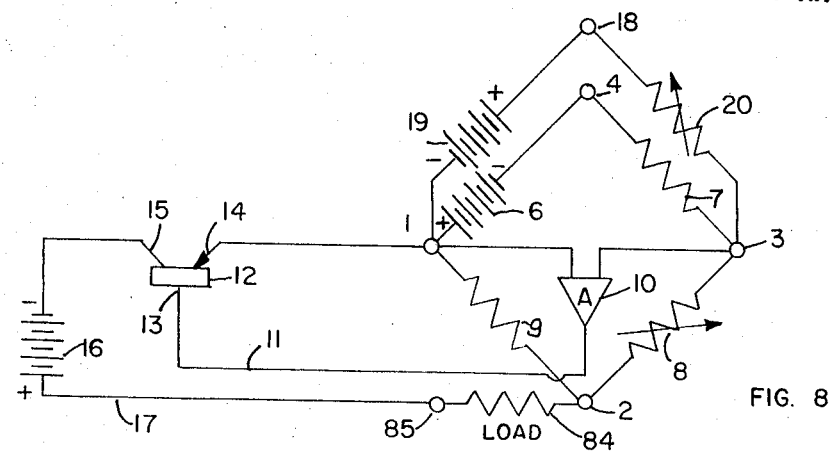
FIGURES 8 and 10 are simplified schematics of a current control form of the present invention.

FIG. 8 is similar to FIG. 2 except in this case the load 84 is connected in series with lead 17 and between terminal 85 and bridge terminal 2. In FIG. 8 resistor 9 acts as a current sensing resistor since the current through load 84 also flows through it and the bridge is balanced when the bridge current is equal to the current through resistor 9 times its resistance divided by the resistance of control resistor 8. Here, as in the case of FIG. 2, the current in load 84 may be modified by the third arm consisting of voltage source 19 in series with resistor 20 connected between bridge terminals 1 and 3.

Figure 9:
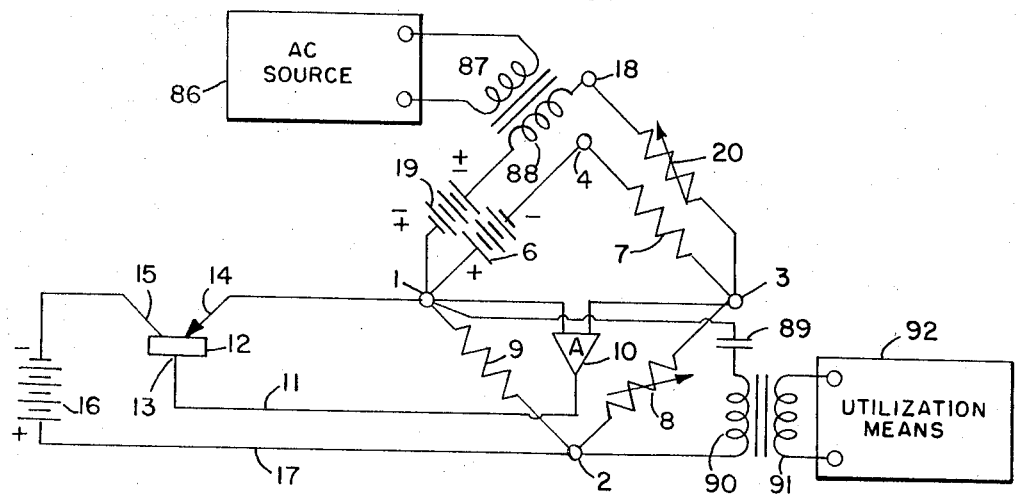
FIGURE 9 is a form of the present invention suitable for providing an A.C. modulated output.

FIG. 9 is similar to FIG. 2 also but with means for providing an alternating current control and output. Since, as has been stated above, the third bridge arm may supply current aiding or opposing the reference current, an alternating current may be introduced in the third arm to provide an alternating current output. This provision for alternating current modulation or output is accomplished by means of a transformer 87–88 with its secondary 88 in series with bridge arm 19–20 and its primary 87 connected to a source of alternating current 86. The controlled output appears across load terminals 1–2 and may be utilized as by providing transformer 90–91 with D.C. blocking capacitor 89 connected in series with primary 90 and utilization means 92 connected across secondary 91.

Figure 10:
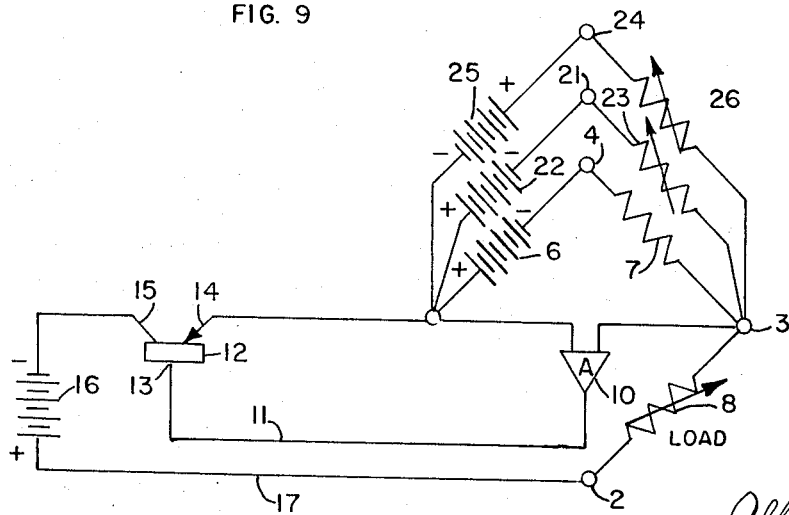

FIG. 10 is a further modification of the triple bridge circuit based on FIG. 3, although its implications are equally applicable to other figures of the drawing. Here in FIG. 10 the load terminals 1–2 are left open and the load is connected between terminals 2 and 3. With this mode of connection the bridge current becomes the load current and its modification and control is identical with the modification and control of the bridge current as set forth above in the description of the operation of FIG. 3.

Since regulation of the systems as illustrated in the various figures of the drawing produce a null between terminals 1 and 3 analysis of the operation can be made with the assumption that a virtual short circuit exists between these two terminals. Among other things this means that the sink impedance for the third or other auxiliary regulating arms is zero. The current to be supplied by the third arm is equal to the voltage of the arm divided by its series resistance regardless of the voltage, currents or impedances of the other arms taken individually or collectively. The third arm is connected on one side to the reference terminal which will generally be the low impedance side on the grounded point of the system, a simplification and convenience in many applications. The third arm system is useful with transistor regulators, vacuum tube regulators or hybrid regulators. The third arm system is useful in voltage regulators, current regulators or combined voltage/current regulators with or without automatic cross-over. One real and unexpected advantage of the third arm system in accordance with the present invention is realized when a Zener regulated or other current sensitive reference voltage is used since the auxiliary regulation is accomplished without affecting the current in the reference arm of the bridge. Because of the flexibility of the third arm arrangement and its ability to accept positive or negative feed-back voltages, it is well suited to use with a discriminator type signal in which zero feed-back represents the desired balanced or predetermined condition and the sensitivity to off balance can be made by decreasing drastically the value of the series connected sensitivity control.

While only a few forms of the present invention have been shown and described, many variations will be apparent to those skilled in the art within the scope and spirit of the invention as set forth in particular in the appended claims.

What is claimed is:

1. A regulated output voltage power supply comprising, in combination, a source of unregulated potential; a reference network including plural branches connected between first and second junction points; a pass transistor connected between one terminal of said source and said first junction point; a first load terminal connected to said first junction point; a balancing control amplifier having its input constituting one of said branches and having its output connected in bias controlling relation to said transistor; potential source means and resistor means connected in series in another of said branches and effective, upon unbalancing of the network, to provide a voltage drop between said junction points; resistance means connected between said second junction point and a third junction point connected to the other terminal of said source of unregulated potential and to the other load terminal; one of said means being adjustable to preset a fixed desired value of output voltage; said network, when the source of potential is at a preset value and the potential between said load terminals is at such fixed desired value of output voltages, being balanced to the extent that said first and second junction points are at the same relative potentials; said network, when the output voltage varies from its preset value due to variation in either the source potential or the load, becoming unbalanced so that there is an operationally effective potential difference, between said first and second junction points, of a relative polarity depending upon the direction of such variation from the respective preset value; said potential difference conditioning said control amplifier to vary the bias of said transistor in an output voltage correcting direction; and including an additional branch connected between said first and second junction points including a source of potential and a current limiting resistor for modifying the output voltage required to balance said network.

2. A regulated output voltage power supply comprising, in combination, a source of unregulated potential; a reference network including plural branches connected between first and second junction points; a pass transistor connected between one terminal of said source and said first junction point; a first load terminal connected to said first junction point; a balancing control amplifier having its input constituting one of said branches and having its output connected in bias controlling relation to said transistor; potential source means and resistor means connected in series in another of said branches and effective, upon unbalancing of the network, to provide a voltage drop between said junction points; resistance means connected between said second junction point and a third junction point connected to the other terminal of said source of unregulated potential and to the other load terminal; one of said means being adjustable to preset a fixed desire value of output voltage; said network, when the source of potential is at a preset value and the potential between said load terminals is at such fixed desired value of output voltage, being balanced to the extent that said first and second junction points are at the same relative potentials; said network, when the output voltage varies from its preset value due to variation in either the source potential or the load, becoming unbalanced so that there is an operationally effective potential difference, between said first and second junction points, of a relative polarity depending upon the direction of such variation from the respective preset value; said potential difference conditioning said control amplifier to vary the bias of said transistor in an output voltage correcting direction; and including a plurality of additional branches connected between said first and second junction points including sources of potential and current limiting resistors in each of said additional branches for modifying the output voltage required to balance said network.

3. A regulated output voltage power supply comprising, in combination, a source of unregulated potential; a reference network including plural branches connected between first and second junction points; a pass transistor connected between one terminal of said source and said first junction point; a first load terminal connected to said first junction point; a balancing control amplifier having its input constituting one of said branches and having its output connected in bias controlling relation to said transistor; potential source means and resistor means connected in series in another of said branches and effective, upon unbalancing of the network, to provide a voltage drop between said junction points; resistance means connected between said second junction point and a third junction point connected to the other terminal of said source of unregulated potential and to the other load terminal; one of said means being adjustable to preset a fixed desired value of output voltage; said network, when the source of potential is at a preset value and the potential between said load terminals is at such fixed desired value of output voltage, being balanced to the extent that said first and second junction points are at the same relative potentials; said network, when the output voltage varies from its preset value due to variation in either the source potential or the load, becoming unbalanced so that there is an operationally effective potential difference, between said first and second junction points, of a relative polarity depending upon the direction of such variation from the respective preset value; said potential difference conditioning said control amplifier to vary the bias of said transistor in an output voltage correcting direction; and including an additional branch connected between said first and second junction points including a source of potential responsive to said output voltage and a current limiting resistor for modifying the output voltage required to balance said network.

4. A regulated output voltage power supply comprising, in combination, a source of unregulated potential; a reference network including plural branches connected between first and second junction points; a pass transistor connected between one terminal of said source and said first junction point; a first load terminal connected to said first junction point; a balancing control amplifier having its input constituting one of said branches and having its output connected in bias controlling relation to said transistor; potential source means and resistor means connected in series in another of said branches and effective, upon unbalancing of the network, to provide a voltage drop between said junction points; resistance means connected between said second junction point and a third junction point connected to the other terminal of said source of unregulated potential and to the other load terminal; one of said means being adjustable to preset a fixed desired value of output voltage; said network, when the source of potential is at a preset value and the potential between said load terminals is at such fixed desired value of output voltage, being balanced to the extent that said first and second junction points are at the same relative potentials; said network, when the output voltage varies from its preset value due to variation in either the source potential or the load, becoming unbalanced so that there is an operationally effective potential difference, between said first and second junction points, of a relative polarity depending upon the direction of such variation from the respective preset value; said potential difference conditioning said control amplifier to vary the bias of said transistor in an output voltage correcting direction; and including an additional branch connected between said first and second junction points including a differential source of potential and a current limiting resistor for modifying the output voltage required to balance said network.

5. A regulated output voltage power supply comprising, in combination, a source of unregulated potential; a reference network including plural branches connected between first and second junction points; a pass transistor connected between one terminal of said source and said first junction point; a first load terminal connected to said first junction point; a balancing control amplifier having its input constituting one of said branches and having its output connected in bias controlling relation to said transistor; potential source means and resistor means connected in series in another of said branches and effective, upon unbalancing of the network, to provide a voltage drop between said junction points; resistance means connected between said second junction point and a third junction point connected to the other terminal of said source of unregulated potential and to the other load terminal; one of said means being adjustable to preset a fixed desired value of output voltage; said network, when the source of potential is at a preset value and the potential between said load terminals is at such fixed desired value of output voltage, being balanced to the extent that said first and second junction points are at the same relative potentials; said network, when the output voltage varies from its preset value due to variation in either the source potential or the load, becoming unbalanced so that there is an operationally effective potential difference, between said first and second junction points, of a relative polarity depending upon the direction of such variation from the respective preset value; said potential difference conditioning said control amplifier to vary the bias of said transistor in an output voltage correcting direction; and including light means connected to said load terminals, light responsive means for providing a potential responsive to light from said light means, and including an additional branch connected between said first and second junction points including at least of the potential from said potential responsive means and a current limiting resistor for modifying the output voltage required to balance said network in accordance with light from said light source.

6. A regulated output voltage power supply comprising, in combination, a source of unregulated potential; a reference network including plural branches connected between first and second junction points; a pass transistor connected between one terminal of said source and said first junction point; a first load terminal connected to said first junction point; a balancing control amplifier having its input constituting one of said branches and having its output connected in bias controlling relation to said transistor; potential source means and resistor means connected in series in another of said branches and effective, upon unbalancing of the network, to provide a voltage drop between said junction points; resistance means connected between said second junction point and a third junction point connected to the other terminal of said source of unregulated potential and to the other load terminal; one of said means being adjustable to preset a fixed desired value of output voltage; said network, when the source of potential is at a preset value and the potential between said load terminals is at such fixed desired value of output voltage, being balanced to the extent that said first and second junction points are at the same relative potentials; said network, when the output voltage varies from its preset value due to variation in either the source potential or the load, becoming unbalanced so that there is an operationally effective potential difference, between said first and second junction points, of a relative polarity depending upon the direction of such variation from the respective preset value; said potential difference conditioning said control amplifier to vary the bias of said transistor in an output voltage correcting direction; and including an additional branch connected between said first and second junction points including a source of alternating current and a current limiting resistor for modifying the output voltage required to balance said network to include an alternating current component.

7. A regulated output voltage power supply comprising, in combination, a source of unregulated potential; a reference network including plural branches connected between first and second junction points; a pass transistor connected between one terminal of said source and said first junction point; a balancing control amplifier having its input constituting one of said branches and having its output connected in bias controlling relation to said transistor; potential source means and resistor means connected in series in another of said branches and effective, upon unbalancing of the network, to provide a voltage drop between said junction points; resistance means connected between said second junction point and a third junction point; load terminals comprising said third junction point and a second terminal of said source; one of said means being adjustable to preset a fixed desired value of output voltage; said network, when the source of potential is at a preset value and the current between said load terminals is at such fixed desired value of output current, being balanced to the extent that said first and second junction points are at the same relative potentials; said network, when the load current varies from its preset value becoming unbalanced so that there is an operationally effective potential difference, between said first and second junction points, of a relative polarity depending upon the direction of such variation from the respective preset value; said potential difference conditioning said control amplifier to vary the bias of said transistor in a load current correcting direction; and including an additional branch connected between said first and second junction points including a source of potential and a current limiting resistor for modifying the current in said load required to balance said network.

No references cited.

JOHN F. COUCH, *Primary Examiner.*

K. D. MOORE, *Assistant Examiner.*